United States Patent

Thorson et al.

(10) Patent No.: US 8,874,105 B2
(45) Date of Patent: Oct. 28, 2014

(54) METHOD AND APPARATUS FOR OBTAINING OVERHEAD INFORMATION WITHIN A COMMUNICATION SYSTEM

(75) Inventors: Dean E. Thorson, Grayslake, IL (US); William P. Alberth, Jr., Prairie Grove, IL (US); Daniel J. DeClerck, Lake Barrington, IL (US); James M. O'Connor, Dallas, TX (US)

(73) Assignee: Motorola Mobility LLC, Libertyville, IL (US)

( * ) Notice: Subject to any disclaimer, the term of this patent is extended or adjusted under 35 U.S.C. 154(b) by 605 days.

(21) Appl. No.: 12/955,058

(22) Filed: Nov. 29, 2010

(65) Prior Publication Data

US 2012/0135774 A1    May 31, 2012

(51) Int. Cl.
*H04W 4/00* (2009.01)
*H04W 48/08* (2009.01)
*H04W 36/00* (2009.01)

(52) U.S. Cl.
CPC .......... *H04W 48/08* (2013.01); *H04W 36/0055* (2013.01)
USPC ........ 455/432.1; 455/444; 455/445; 455/446; 455/447; 455/448; 370/315; 370/316; 370/317; 370/318; 370/319

(58) Field of Classification Search
USPC ........................ 455/432.1–449, 550.1, 552.1; 370/315–320
See application file for complete search history.

(56) References Cited

U.S. PATENT DOCUMENTS

| | | | |
|---|---|---|---|
| 5,267,261 A | 11/1993 | Blakeney, II et al. | |
| 6,724,739 B1 | 4/2004 | Tiedemann, Jr. et al. | |
| 6,982,971 B2 * | 1/2006 | Tiedemann et al. | 370/333 |
| 2003/0222819 A1 * | 12/2003 | Karr et al. | 342/457 |
| 2006/0018280 A1 | 1/2006 | Kumar et al. | |
| 2007/0149196 A1 * | 6/2007 | Choi et al. | 455/436 |
| 2009/0310568 A1 | 12/2009 | Chen et al. | |
| 2010/0029278 A1 | 2/2010 | Fang et al. | |
| 2010/0056149 A1 * | 3/2010 | Jubin et al. | 455/436 |
| 2010/0069072 A1 * | 3/2010 | Gogic et al. | 455/436 |
| 2011/0189995 A1 * | 8/2011 | Tinnakornsrisuphap et al. | 455/436 |
| 2012/0244864 A1 * | 9/2012 | Fujii | 455/436 |

FOREIGN PATENT DOCUMENTS

WO    2007012054 A2    1/2007

OTHER PUBLICATIONS

Patent Cooperation Treaty, International Search Report and Written Opinion of the International Searching Authority for International Application No. PCT/US2011/062077, Feb. 15, 2012, 13 pages.

* cited by examiner

*Primary Examiner* — Fayyaz Alam
(74) *Attorney, Agent, or Firm* — Faegre Baker Daniels LLP

(57) ABSTRACT

A method and apparatus for obtaining overhead information by a mobile is provided herein. During operation, the mobile will be communicating with a first system on an active data channel. The mobile node will be able to measure pilot PN phase and amplitude for a second system that is a potential candidate to handoff and will have that information available. The data channel of the active service is used to query a proxy server that provides overhead information for the second base station. More particularly, when PN phase and amplitude information is provided to the proxy server, the proxy server will identify the base station and provide the overhead information needed to associate with the second base station.

16 Claims, 3 Drawing Sheets

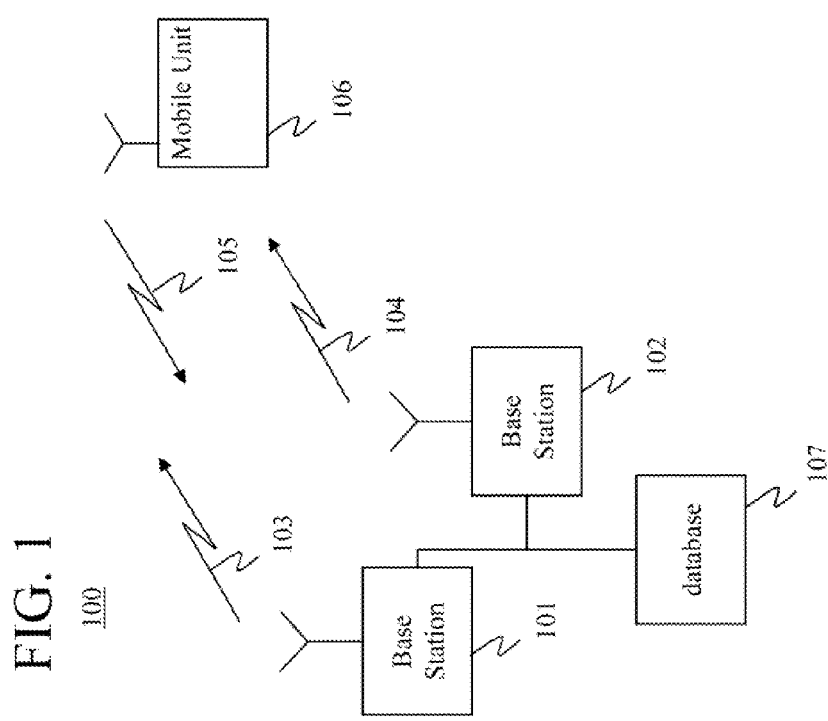
FIG. 1
100
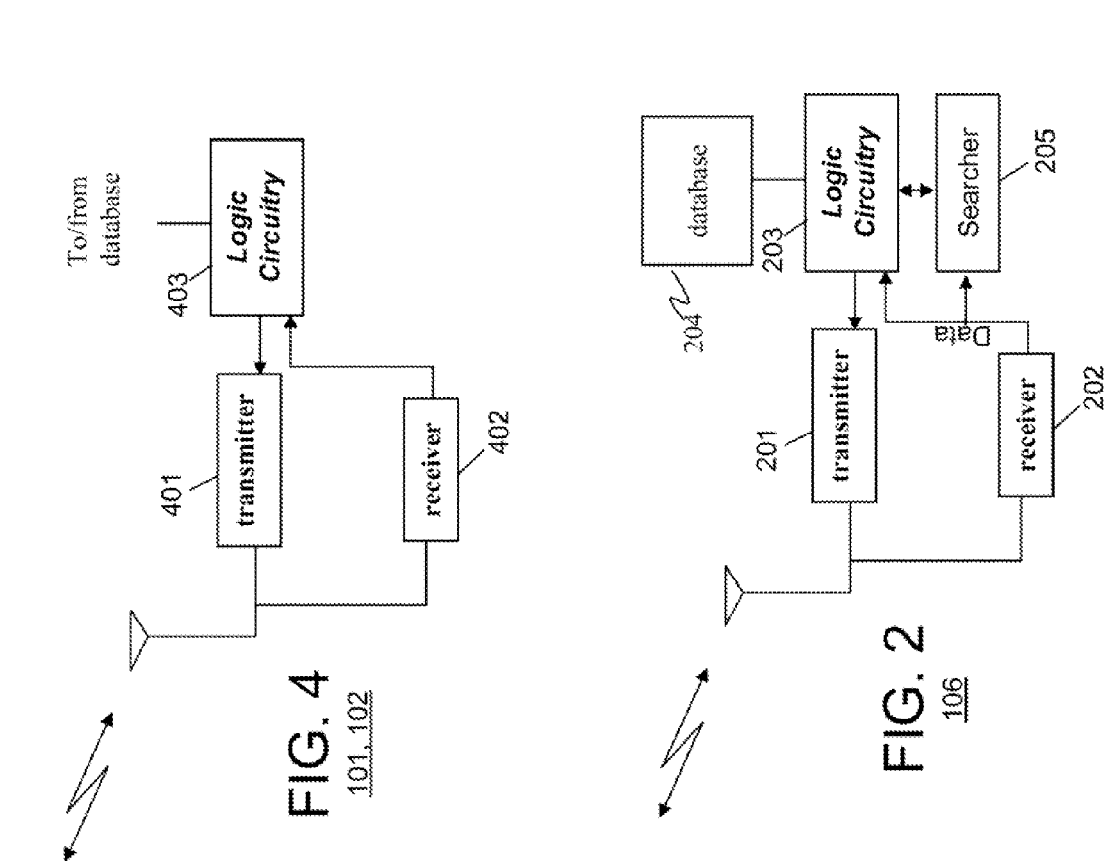
FIG. 4
101, 102
FIG. 2
106

METHOD AND APPARATUS FOR OBTAINING OVERHEAD INFORMATION WITHIN A COMMUNICATION SYSTEM

FIELD OF THE INVENTION

The present invention relates generally to obtaining communication system information by a mobile unit, and in particular, to a method and apparatus for obtaining overhead information by a mobile unit within a communication system.

BACKGROUND OF THE INVENTION

Many mobile communication devices need to be able to operate using more than one system protocol. For example, a mobile device moving from one geographic area to another may need to switch from one communication system protocol to another communication system protocol in order to maintain communication. In such a scenario, a mobile unit may be actively communicating with a base station (active base station) utilizing a first communication system protocol (e.g., a 3GPP communication system protocol). When the mobile unit moves out of the coverage area of the active base station, it may need to switch to an idle base station using another communication system protocol (e.g., another 3GPP system, 3GPP2 or IEEE 802.11 communication system protocol). In such hybrid operation, where a mobile node contains transceivers for more than one spread spectrum technology, the mobile needs to acquire overhead information in order to become active on the idle base station.

An example of this is a hybrid Long Term Evolution/CDMA Evolution Data Only revision A (LTE/EV-DorA) phone, active on LTE, performing system selection and pilot maintenance on an (EV-DOrA) system. The hybrid mode phone can scan the idle system for pilots, but cannot stop operating on the active system long enough to acquire system overhead information from the common signaling channels of the idle technology. For example, the acquisition of all overhead information on EV-DOrA systems can take at least 1.28 seconds, which can kill all communication on the active system. Therefore a need exists for a method and apparatus for obtaining overhead information by a mobile unit without interrupting the active system's operation.

BRIEF DESCRIPTION OF THE DRAWINGS

FIG. 1 is a block diagram of a communication environment.

FIG. 2 is a block diagram of the mobile unit of FIG. 1.

FIG. 4 is a block diagram of a base station.

Figure 3:
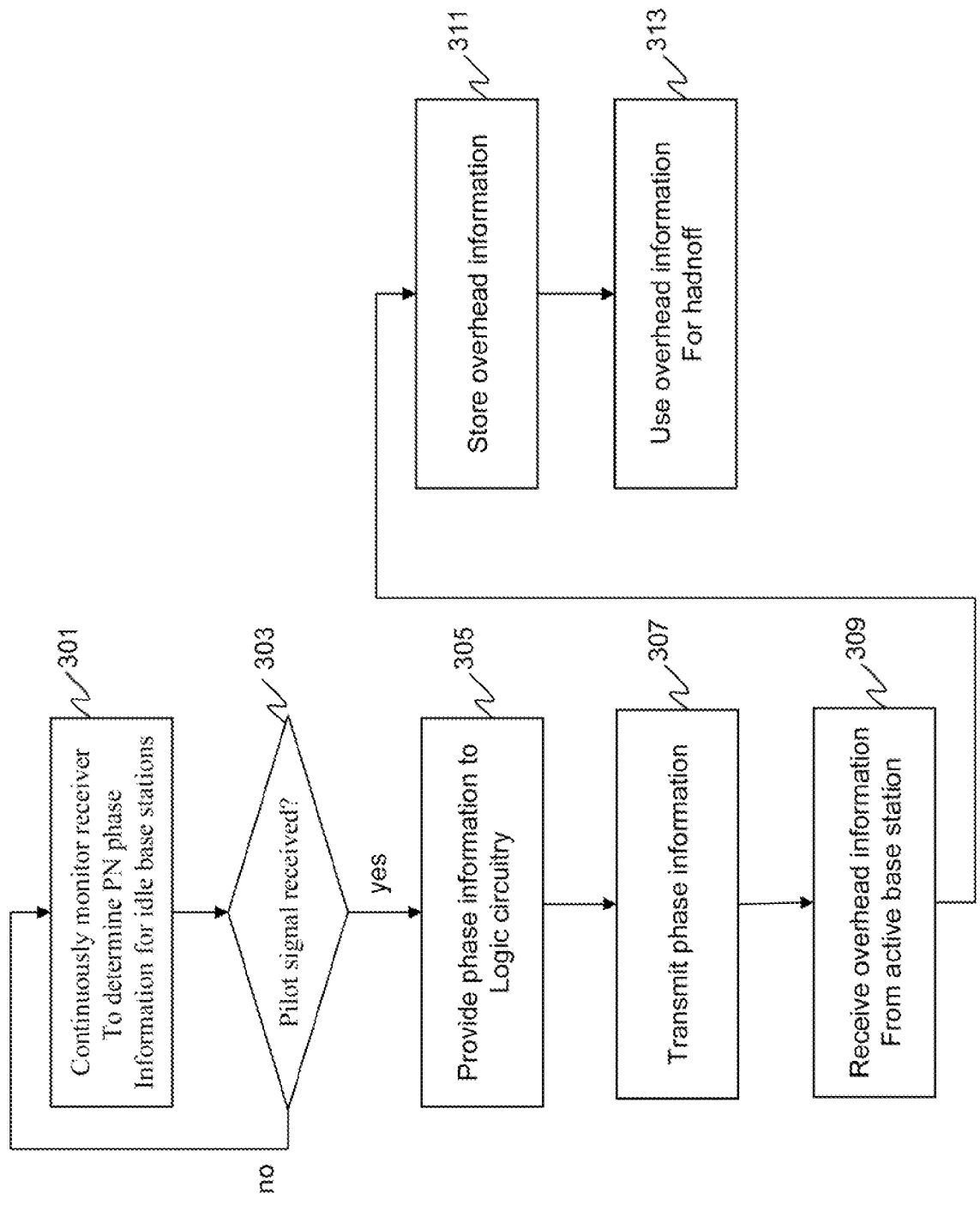
FIG. 3 is a flow chart showing operation of the mobile unit of FIG. 2.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP, dedicated logic gates). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for obtaining overhead information by a mobile is provided herein. During operation, the mobile will be communicating with a first system on an active data channel. The mobile node will be able to measure pilot PN phase and amplitude for a second system that is a potential candidate for handoff. The data channel of the active service is used to query a proxy server that provides overhead information for the second base station. More particularly, when PN phase (and possibly amplitude information) are provided to the proxy server, the proxy server will identify the base station and provide the overhead information needed to associate with the second base station.

Because the overhead information is obtained using the active base station's data channel, the overhead information will be acquired without interrupting the existing active communication session. This allows the mobile node to hand over to the second base station without interruption.

Prior to describing operation of a communication system, the following definitions are provided to set the necessary background.

Active Base Station—A base station that a mobile node is actively communicating with. The communication may comprise the bi-directional transmission of voice and/or data.

Candidate Base Station—A base station that a mobile node is not actively communicating with, but has a signal strength above a predetermined level. Communication may take place with the candidate base station if communication ceases with the current active base station.

Idle Base Station—A base station that a mobile node is not actively communicating with. The idle base station may be a candidate base station.

Overhead Information—Any information that is needed for a mobile node to begin communications with an idle base station. Such information includes, but is not limited to system parameters, access parameters, channel list, neighbor list, etc.

Turning now to the drawings, where like numerals designate like components, FIG. 1 is a block diagram showing a mobile node within heterogeneous communication environment 100. As shown, communication environment 100 comprises at a minimum base station 101, base station 102, database 107, and mobile node 106 (mobile node). Base stations 101-102 may utilize any number of communication system protocols. For example, base station 101 may utilize a WiMax communication system protocol as described in IEEE 802.16 while base station 102 utilizes a 3GPP2 communication system protocol as described in comprise a communication system as described in the 3GPP2 standards.

Database 107 comprises standard random access memory and is used to store overhead information needed for mobile node 106 to acquire a particular base station. Such information includes, but is not limited to system parameters, access parameters, channel list, neighbor list, etc. This information is generally periodically transmitted by a base station.

Mobile node 106 is preferably a dual-mode node that is capable of communication utilizing any number of communication system protocols, but, for example, at a minimum utilizes both the WiMax and 3GPP2 communication system protocols. As shown, remote unit 106 is communicating with base stations 101 and 102 via uplink communication signals 105, base station 101 is communicating with mobile node 106 via downlink communication signals 104, and base station 102 is communicating with mobile node 106 via downlink communication signals 104.

Base stations 101 and 102 transmit voice and data over multiple channels. In addition, each base station, and possibly each sector of base stations 101 and 102 broadcasts a pilot channel. The pilot channel transmitted by a base station is commonly received by all mobile nodes within range. The pilot is used to obtain fast acquisition of new multipath components and for estimation of channel phase and multipath component strength. The pilot channel transmitted by base stations 101 and 102 uses the same repeating Pseudo Noise (PN) sequence but with a different chip offset. Base stations and base station sectors are uniquely identified by using a unique starting phase or starting time for the PN sequences.

In FIG. 1, mobile node 106 is actively communicating with a first base station, (e.g., base station 101) that provides communication services according to a first communication system protocol. Each base station 101 and 102 (and possible each sector of base stations 101 and 102) transmits a pilot signal encoded with a pseudo random code having a unique time offset, commonly known as PN offset. Mobile node 106 may detect presence of a pilot signal from any sector of base stations 101 and 102 (possibly a new pilot signal other than the one that has already been detected). As a normal part of routine operation performed by mobile node 106 for maintaining an adequate communication link, mobile node 106 measures pilot signal strength of the pilot signal. Based on the pilot signal strength and, possibly, other information, mobile node 106 may find a more appropriate base station (e.g., base station 102) or sector for hand-off of the communication link. This hand-off may be to a base station employing a totally different communication system protocol.

In prior-art systems, mobile node 106 can scan idle base station 102 for pilots, but cannot stop operating on the active system long enough to acquire system overhead information from the common signaling channels transmitted from base station 102. In order to address this issue, database 107 is provided comprising overhead information needed for mobile node 106 to acquire a particular base station.

When mobile node 106 determines a PN phase of a candidate idle base station, it will query database 107 with the PN phase and potentially the amplitude of the measured PN sequence. Additionally other information may be provided to database 107. Such information may include a current operating region/domain or identity information of the active base station. It should be noted that database 107 is accessed through the active base station's data channel.

Database 107 converts the PH phase information to an identifier for a specific base station/access node within the idle system and determines the overhead information for that specific base station. Copies of the overhead information are returned to node 106 via the active data channel in order to provide node 106 with all the information necessary to access the idle network.

The information stored in database 107 is intended to aid mobile node 106 in accessing the common signaling channel in the idle system. However, that data can be augmented to include internal system overhead information such as system parameters, access parameters, a channel list, and LCP/CHAP/PPP setup information as well. This would enable the proxy server to perform negotiations specific to each protocol.

FIG. 2 is a block diagram of mobile unit 106 of FIG. 1. As shown, mobile node 106 comprises logic circuitry 203, receive circuitry 202, transmit circuitry 201, and searcher 205. Logic circuitry 203 preferably comprises a microprocessor controller, such as, but not limited to an ARM11 microprocessor. Logic circuitry 203 serves as means for controlling mobile node 106. Additionally receive and transmit circuitry are common circuitry known in the art for communication utilizing at least two well known communication protocols, and serve as means for transmitting and receiving voice and data. Searcher 205 is utilized for scanning for PN pilot transmissions from base stations.

During operation, receiver 202 is continuously being accessed by searcher 205. When an idle base station's pilot transmissions are received, searcher 205 will determine PN phase information and amplitude information for the pilot transmissions from idle base stations. It should be noted that in one embodiment, phase and amplitude information for the pilot is not obtained until it is determined that the base station is a candidate base station.

When PN phase and amplitude information is obtained by searcher 205, the information is provided to logic circuitry 203, which prepares a query and instructs transmitter 201 to transmit the query to the active base station. As discussed above, the active base station may be utilizing a communication system protocol that differs from the idle base station. In response to the query, the active base station will access database 107 (acting as a proxy server) and obtain overhead information from database 107. The active base station will then provide this information to mobile node 106. In particular, both the query and the response are received over a data channel on the active system. The response is received by receiver 202 and passed to logic circuitry 203. This information may then be stored internal to mobile node 106 within an internal database 204. If and when a handover to the idle base station is needed, the overhead information is then appropriately utilized to complete the handover.

FIG. 3 is a flow chart showing operation of the mobile unit of FIG. 2. The logic flow begins at step 301 where receiver 202 is continuously being accessed by searcher 205 in order to determine identification information on candidate or idle base stations. In this embodiment PN phase information (e.g., a chip offset) of a pilot signal (e.g., a PN sequence) is used as identification information. At step 303, searcher 205 determines if an idle base station's pilot transmissions are received. If so, searcher 205 will determine PN phase information and amplitude information for the pilot transmissions from the idle base station. It should be noted that in one embodiment, phase and amplitude information for the pilot is not obtained until it is determined that the base station is a candidate base station.

When PN phase and amplitude information is obtained by searcher 205, the information is provided to logic circuitry 203 (at step 305), which prepares a query and instructs transmitter 201 to transmit the query to the active base station via transmitter 201 (step 307) over a data channel. At step 309 receiver 202 receives overhead information from database 107. This information is received from the active base station over the data channel. The information is then stored in database 204 (step 311). If and when a handover to the idle base station is needed, the overhead information is then appropriately utilized to complete the handover (step 313). In this embodiment the candidate or idle base stations utilize a first communication system protocol and the active base station utilizes a second communication system protocol.

FIG. 4 is a block diagram of a base station of FIG. 1. As shown, the base station comprises logic circuitry 403, receive circuitry 402, and transmit circuitry 401. Logic circuitry 403 preferably comprises a microprocessor controller, such as, but not limited to an ARM11 microprocessor. Logic circuitry 403 serves as means for controlling the base station. Additionally receive and transmit circuitry are common circuitry known in the art for communication utilizing at least two well known communication protocols, and serve as means for transmitting and receiving voice and data.

During operation, receiver 402 receives a request for overhead information from a mobile node. As part of the request, base station identification information (e.g., a base station's PN phase) is provided. In response, logic circuitry 403 queries database 107. As part of the query, the identification information (PN phase) is provided. In response, overhead information on the base station will be provided to logic circuitry 403. Logic circuitry 403 will then instruct transmitter 401 to transmit this overhead information to the mobile node. This information may then be stored internal to mobile node 106 within internal database 204. If and when a handover to the idle base station is needed, the overhead information is then appropriately utilized to complete the handover.

Figure 5:
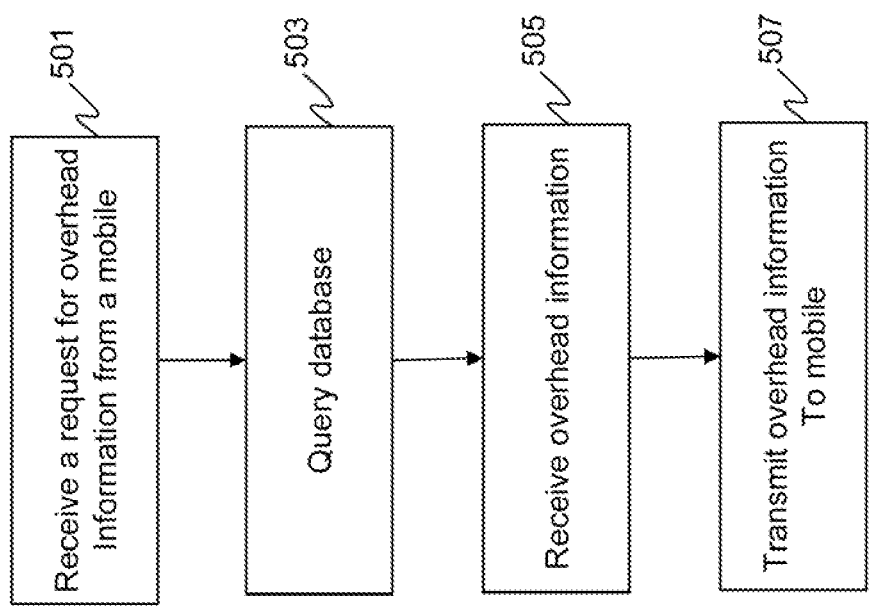
FIG. 5 flow chart showing operation of the base station of FIG. 4.

FIG. 5 flow chart showing operation of the base station of FIG. 4. The logic flow begins at step 501 where receiver 402 receives a request for overhead information from a mobile node. As part of the request, the mobile unit provides base station identification information (e.g., PN phase) for an idle and/or candidate base station. At step 503, logic circuitry 403 queries database 107. As part of the query, the base station identification information (e.g., base station PN) is provided. At step 505, overhead information on the base station is received by logic circuitry 403. Logic circuitry 403 will then instruct transmitter 401 to transmit this overhead information to the mobile node (step 507). This information may then be stored internal to mobile node 106 within internal database 204. If and when a handover to the idle base station is needed, the overhead information is then appropriately utilized to complete the handover.

While the invention has been particularly shown and described with reference to a particular embodiment, it will be understood by those skilled in the art that various changes in form and details may be made therein without departing from the spirit and scope of the invention. For example, in the above described invention, PN phase and amplitude information are provided to a database to obtain overhead information. It should be noted that in alternate embodiments of the present invention, any information may be provided to the database in order to identify a candidate base station as long as the information is provided over the active base station's data channel. Additionally, the above described invention provides a technique to hand off between base stations of differing communication system protocols, however, handoff between base stations utilizing the same system protocol may be accomplished by the above technique. It is intended that such changes come within the scope of the following claims:

The invention claimed is:

1. A method for obtaining overhead information within a communication system, the method comprising the steps of:
   receiving, by a mobile node, a pilot signal from an idle base station;
   determining, by the mobile node, a phase of the pilot signal;
   determining, by the mobile node, that it cannot obtain overhead information from the idle base station;
   providing, by the mobile node, the phase of the pilot signal to an active base station; and
   receiving, by the mobile node, overhead information on the idle base station from the active base station in response to the provided phase of the pilot signal.

2. The method of claim 1 wherein the pilot signal comprises a PN sequence.

3. The method of claim 2 wherein the phase of the pilot signal comprises a chip offset.

4. The method of claim 1 wherein the idle base station utilizes a first communication system protocol and the active base station utilizes a second communication system protocol.

5. The method of claim 1 wherein the step of providing the phase to the active base station comprises the step of providing the phase over a data channel, and wherein the step of receiving the overhead information comprises the step of receiving the overhead information over the data channel.

6. The method of claim 1 wherein the overhead information comprises information that is needed for a mobile node to begin communications with the idle base station.

7. The method of claim 1 wherein the active base station comprises a base station in active communication with the mobile node.

8. The method of claim 1 wherein the idle base station comprises a base station that the mobile node is not actively communicating with.

9. A method for obtaining overhead information within a communication system, the method comprising the steps of:
   receiving, by a mobile node, identification information for an idle base station;
   determining, by the mobile node, that it cannot obtain overhead information from the idle base station;
   providing, by the mobile node, the identification information to an active base station; and; and
   receiving, by the mobile node, overhead information on the idle base station from the active base station in response to the provided identification information.

10. The method of claim 9 wherein the identification information comprises PN phase information.

11. The method of claim 10 wherein the PN phase information comprises a chip offset.

12. The method of claim 9 wherein the idle base station utilizes a first communication system protocol and the active base station utilizes a second communication system protocol.

13. The method of claim 9 wherein the step of providing the identification information comprises the step of providing the information over a data channel, and wherein the step of receiving the overhead information comprises the step of receiving the overhead information over the data channel.

14. The method of claim 9 wherein the overhead information comprises information that is needed for a mobile node to begin communications with the idle base station.

15. The method of claim 9 wherein the active base station comprises a base station in active communication with the mobile node.

16. The method of claim 9 wherein the idle base station comprises a base station that the mobile node is not actively communicating with.

* * * * *